United States Patent
Eidus et al.

(10) Patent No.: US 9,183,053 B2
(45) Date of Patent: *Nov. 10, 2015

(54) MIGRATING THREADS ACROSS NUMA NODES USING CORRESPONDING PAGE TABLES AND BASED ON REMOTE PAGE ACCESS FREQUENCY

(71) Applicant: Red Hat Israel, Ltd., Raanana (IL)

(72) Inventors: Izik Eidus, Raanana (IL); Uri Lublin, Raanana (IL); Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/177,711

(22) Filed: Feb. 11, 2014

(65) Prior Publication Data

US 2014/0223442 A1    Aug. 7, 2014

Related U.S. Application Data

(63) Continuation of application No. 12/750,251, filed on Mar. 30, 2010, now Pat. No. 8,656,397.

(51) Int. Cl.
*G06F 9/50* (2006.01)
*G06F 12/10* (2006.01)
*G06F 11/34* (2006.01)

(52) U.S. Cl.
CPC .............. *G06F 9/50* (2013.01); *G06F 9/5088* (2013.01); *G06F 11/3409* (2013.01); *G06F 12/109* (2013.01); *G06F 2212/2542* (2013.01)

(58) Field of Classification Search
None
See application file for complete search history.

(56) References Cited

U.S. PATENT DOCUMENTS

| | | | |
|---|---|---|---|
| 5,493,663 A | 2/1996 | Parikh | |
| 5,784,697 A * | 7/1998 | Funk et al. | 711/170 |
| 5,860,116 A * | 1/1999 | Washington | 711/148 |
| 5,918,249 A | 6/1999 | Cox et al. | |
| 6,769,017 B1 * | 7/2004 | Bhat et al. | 709/214 |
| 7,222,221 B1 | 5/2007 | Agesen et al. | |
| 7,421,575 B2 | 9/2008 | Ang et al. | |
| 7,434,002 B1 | 10/2008 | Zedlewski et al. | |
| 8,392,661 B1 | 3/2013 | Metcalf | |

(Continued)

OTHER PUBLICATIONS

USPTO, Office Action for U.S. Appl. No. 12/750,251, mailed Jun. 5, 2012.
USPTO, Final Office Action for U.S. Appl. No. 12/750,251, mailed Jan. 2, 2013.
USPTO, Advisory Action for U.S. Appl. No. 12/750,251, mailed Mar. 15, 2013.

(Continued)

*Primary Examiner* — Emerson Puente
*Assistant Examiner* — Benjamin Wu
(74) *Attorney, Agent, or Firm* — Lowenstein Sandler LLP

(57) ABSTRACT

Implementations provide for tracking memory accesses to optimize processor task placement is disclosed. A method includes creating a page table (PT) hierarchy associated with a thread, wherein the PT hierarchy comprises identifying information of memory pages and access bits corresponding to each of the memory pages, setting the respective access bit of one or more of the memory pages accessed by the thread while the thread is executing, collecting access bit information from the PT hierarchy associated with the thread, wherein the access bit information comprises the set access bits in the PT hierarchy, determining, in view of the collected access bit information, memory access statistics for the thread, and utilizing, during runtime of the thread, the memory access statistics for the thread in a determination of whether to migrate the thread to another processing device during the runtime of the thread.

20 Claims, 5 Drawing Sheets

(56) References Cited

U.S. PATENT DOCUMENTS

| | | | |
|---|---|---|---|
| 2003/0069920 A1* | 4/2003 | Melvin et al. | 709/108 |
| 2006/0218556 A1* | 9/2006 | Nemirovsky et al. | 718/104 |
| 2006/0236070 A1 | 10/2006 | Wang et al. | |
| 2009/0006805 A1 | 1/2009 | Anderson et al. | |
| 2009/0037585 A1 | 2/2009 | Miloushev et al. | |
| 2009/0187713 A1 | 7/2009 | Zedlewski et al. | |
| 2009/0313445 A1 | 12/2009 | Pandey et al. | |
| 2009/0320022 A1 | 12/2009 | Ries et al. | |
| 2010/0058346 A1 | 3/2010 | Narang et al. | |
| 2010/0229177 A1 | 9/2010 | Chung et al. | |
| 2010/0325383 A1 | 12/2010 | Karamcheti et al. | |
| 2011/0016290 A1 | 1/2011 | Chobotaro et al. | |
| 2011/0066790 A1 | 3/2011 | Mogul et al. | |
| 2011/0072234 A1* | 3/2011 | Chinya et al. | 711/207 |

OTHER PUBLICATIONS

USPTO, Notice of Allowance for U.S. Appl. No. 12/750,251, mailed Oct. 8, 2013.

USPTO, Office Action for U.S. Appl. No. 14/177,711, mailed Oct. 7, 2014.

Hsieh et al., "Computation Migration: Enhancing Locality for Distributed-Memory Parallel Systems", ACM SIGPLAN Notices, vol. 28 Issue 7, Jul. 1993, 10 pages.

Bertozzi et al., "Supporting task migration in multi-processor systems-on-chip: a feasibility study", Date'06 Proceedings of the conference on Design, automation and test in Europe (2006), 6 pages.

Mu et al., "Interactive Locality Optimization on NUMA Architectures", In Proceedings of the ACM Symposium on Software Visualization, Jun. 2003, 10 pages.

\* cited by examiner

MIGRATING THREADS ACROSS NUMA NODES USING CORRESPONDING PAGE TABLES AND BASED ON REMOTE PAGE ACCESS FREQUENCY

RELATED APPLICATION

This application is a continuation of U.S. patent application Ser. No. 12/750,251, filed on Mar. 30, 2010, the entirety of which is incorporated herein by reference.

TECHNICAL FIELD

The embodiments of the invention relate generally to memory management and, more specifically, relate to tracking memory accesses to optimize processor task placement.

BACKGROUND

Non-Uniform Memory Access or Non-Uniform Memory Architecture (NUMA) is a computer memory design used in multiprocessor systems, where the memory access time depends on the memory location relative to the processor. Under NUMA, a processor can access its own local memory faster than non-local memory, that is, memory local to another processor or memory shared between processors.

NUMA attempts to address the problem of processors starved for data due to waiting on memory accesses to complete. NUMA provides for separate memory for each processor (or group of processors) in a multiprocessor system, thereby avoiding the performance hit when several processors attempt to address the same memory. Each grouping of processor and associated connected memory is known as a NUMA node.

Of course, not all data ends up confined to a single task, which means that more than one processor may require the same data. To handle these cases, NUMA systems include additional hardware and/or software to move data between banks. However, the performance of the multiprocessor system with NUMA nodes depends on the exact nature of the tasks running on each NUMA node at any given time. For instance, memory access will be much slower when a processor in one NUMA node has to access memory in another NUMA node. If such cross-node memory accesses occur frequently, then the multiprocessor system will incur a significant negative performance impact.

It is advantageous for a system implementing NUMA to try to minimize inter-node communication as much as possible. As such, a mechanism to optimize processor task placement in NUMA nodes in order to minimize inter-node communication would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
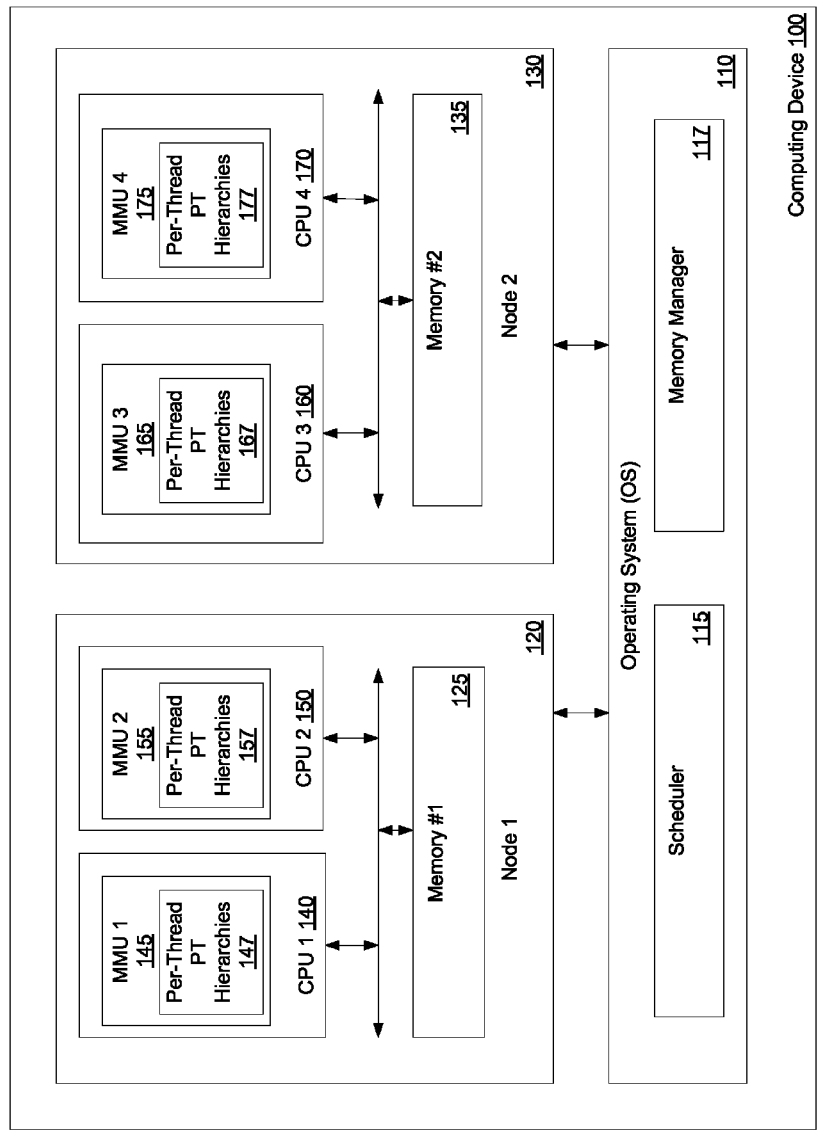
FIG. 1 is a block diagram of a computing device implementing memory optimization in a non-uniform memory access (NUMA) architecture according to embodiments of the invention.

Embodiments of the invention provide for tracking memory accesses to optimize processor task placement. A method of embodiments of the invention includes creating a page table (PT) hierarchy associated with a thread, wherein the PT hierarchy comprises identifying information of memory pages and access bits corresponding to each of the memory pages, setting the respective access bit of one or more of the memory pages accessed by the thread while the thread is executing, collecting access bit information from the PT hierarchy associated with the thread, wherein the access bit information comprises the set access bits in the PT hierarchy, determining, in view of the collected access bit information, memory access statistics for the thread, and utilizing, during runtime of the thread, the memory access statistics for the thread in a determination of whether to migrate the thread to another processing device during the runtime of the thread.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc. For purposes of the following description, the terms central processing unit (CPU) and processor may be used interchangeably.

Embodiments of the invention provide a mechanism for tracking memory accesses in a non-uniform memory access (NUMA) system to optimize processor task placement. According to the invention, a memory management unit of each central processing unit (CPU) tracks memory accesses of a relevant CPU, and more specifically memory access per running thread on the CPU. Based on this information, thread placement on CPUs can be modified during runtime (e.g., dynamically) to minimize the path of memory accesses, thus reducing memory access time.

FIG. 1 is a block diagram of a computing device 100 implementing memory optimization in a NUMA architecture according to embodiments of the invention. Computing device 100 implements a NUMA architecture, where some regions of memory are on physically different buses from other regions. For instance, computing device 100 includes an operating system (OS) 110, connected to two NUMA nodes 120, 130. Each NUMA node 120, 130 includes a memory 125, 135, and a group of processors 140-170. Node 1 120 includes memory 125 with a local memory bus to CPU 1 140 and CPU 2 150. Similarly, Node 2 130 includes memory 135 with a local memory bus to CPU 3 160 and CPU 4 170.

In the NUMA architecture implemented by computing device 100, the terms "local memory" and "remote memory" are typically used in reference to a currently running thread. Local memory is the memory 125, 135 that is on the same node 120, 130 as the CPU currently running the thread. Any memory that does not belong on the node on which the thread is currently running is remote. For instance, memory 125 would be considered local to any threads running on CPUs 1 and 2 140, 150 and remote to any threads running on CPUs 3 and 4 160, 170. Because NUMA uses local and remote memory, it takes longer to access remote memory than local memory. As such, embodiments of the invention provide an optimization to improve memory access time in a NUMA architecture.

In computing device 100, the OS 110 includes a scheduler 115 that makes the decision on where threads of CPU tasks should be placed to optimize memory access. If several threads are accessing the same memory device, or if a thread is consistently accessing remote memory, then this will interfere with the performance of computing device 100. For instance, if a thread is placed to run on CPU1 140, but accesses remote memory 135 for a majority of the time, then this impacts the performance of computing device 100. It would make sense to move this thread to the node with that remote memory (e.g., node 2 130) so that the thread accesses memory faster.

Previously, thread placement decisions were made in advance of runtime and were not a dynamic assessment. In addition, in prior art systems it was not possible to determine what node and what memory a thread was accessing. This is because a single page table (PT) hierarchy was used to track any access statistics. This page table hierarchy did not provide information regarding which node memory access originated from. The single PT hierarchy only showed which memory was accessed (not where it was accessed from).

To address this issue, embodiments of the invention analyze the memory access history of every running thread and utilize this information as a factor in the determination to dynamically migrate the thread to other processors in the system in order to increase system performance. To obtain memory access information for each thread, embodiments of the invention utilize a memory manger 117 of the OS 110 to create a separate PT hierarchy 147, 157, 167, 177 for each thread running in computing device 100. In one embodiment, the memory manager 117 is shown as part of the OS 110. However, one skilled in the art will appreciate that hardware implementations of the memory manager 117 outside of the OS 110 are also possible. Although embodiments of the invention discuss separate PT hierarchies per thread, one skilled in the art will appreciate that embodiments of the invention may also maintain a separate PT hierarchy per each CPU, or a group of threads running on the same CPU.

Subsequently, when a thread tries to access any physical memory 125, 135, the CPU 140-170 of the thread moves through the thread's separate PT hierarchy 147, 157, 167, 177 and sets an access bit for any memory locations (memory pages) accessed by the specific thread. The scheduler 115 is then able to track the access bit history for each thread, and use this information to decide whether a thread should be re-located to another node 120, 130 for scheduling and optimization purposes.

As illustrated in FIG. 1, each operating CPU 140-170 in a node 120, 130 includes a memory management unit (MMU) 145, 155, 165, 175. MMU 145, 155, 165, 175 is typically implemented as hardware in each operating CPU 140-170. In embodiments of the invention, the memory manager 117 is responsible for creating the PT hierarchies 147, 157, 167, 177 for each thread and configuring the MMU 145, 155, 165, 175 to use these PT hierarchies 147, 157, 167, 177. The PT hierarchy 147, 157, 167, 177 of each thread is initially identical, and then diverges from other thread PT hierarchies in terms of which memory access bits are set based on memory accesses of the thread. The MMU 145, 155, 165, 175 is responsible for accessing the created PT hierarchies 147, 157, 167, 177 and updating the access bits that will cause the PT hierarchies to diverge over time.

In some embodiments, the memory access information of each thread is just one consideration in the determination of whether a thread should be migrated to another node 120, 130. One skilled in the art will appreciate that other considerations also fall into the determination, such as utilization rates of each node 120, 130, workload on each node 120, 130, and so on.

Figure 2:
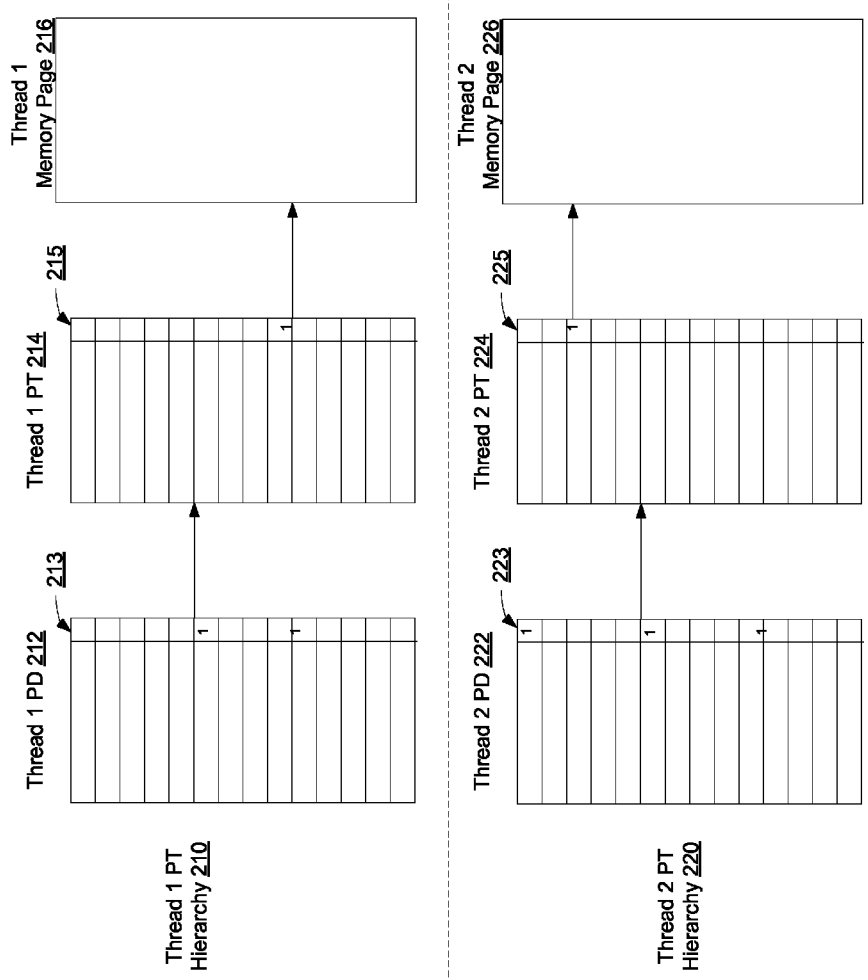
FIG. 2 is a block diagram of two different thread page table hierarchies according to an embodiment of the invention.

FIG. 2 is a block diagram of two different thread PT hierarchies 210, 220 according to an embodiment of the invention. In one embodiment, thread 1 and thread 2 PT hierarchies 210, 220 are created and maintained by MMU 145, 155, 165, 175 described with respect to FIG. 1.

In general, a PT is a memory structure that translates virtual memory addresses to physical memory addresses. A PT hierarchy is tiered, multi-level structure of page tables utilized to keep virtual-to-physical translation time low in the case of a large addressable memory space. A PT and its corresponding PT hierarchy do not take much memory space, and as such, the creation of many PT hierarchies on a per-thread basis is a small trade-off in terms of costs for embodiments of the invention.

Upon creation, thread 1 PT hierarchy 210 is identical to thread 2 PT hierarchy 220. The PT hierarchies 210, 220 each represent the addressable memory space for the task performed by thread 1 and thread 2, respectively. As illustrated in FIG. 2, the thread 1 and thread 2 PT hierarchies 210, 220 are shown as 2-tiered PT structures. However, one skilled in the art will appreciate that embodiments of the invention are not limited to such a PT hierarchy structure and may operate on any other type of PT structure known in the art.

Each thread PT hierarchy 210, 220 includes a highest-level page directory (PD) 212, 222. PD 212, 222 is indexed to locate a lower-level PT 214, 224. As shown, an access bit 213, 223 may be set in PD 212, 222 when a lower-level PT 214, 224 is indexed from PD 212, 222. It is at this point that the individual thread 1 and thread 2 PT hierarchies 210, 220 diverge, as each thread may be accessing differing areas of memory, and as such, will have different access bits 213, 223 set. From PT 214, 224, a desired memory page 216, 226 is accessed via the virtual-to-physical translations provided by PT 214, 216. Similar to PD 212, 222, each PT includes access bits 215, 225 that are set whenever the memory page 216, 226 indexed from the PT 214, 224 is accessed.

Utilizing the information gleaned from the thread-specific access bits 213, 215, 223, 225 of PT hierarchies 210, 220, an OS may determine whether thread 1 or thread 2 is accessing local or remote memory and the frequency of such access. This information may then be used in the determination of whether thread 1 or thread 2 should be migrated to a different node in the system.

Figure 3:
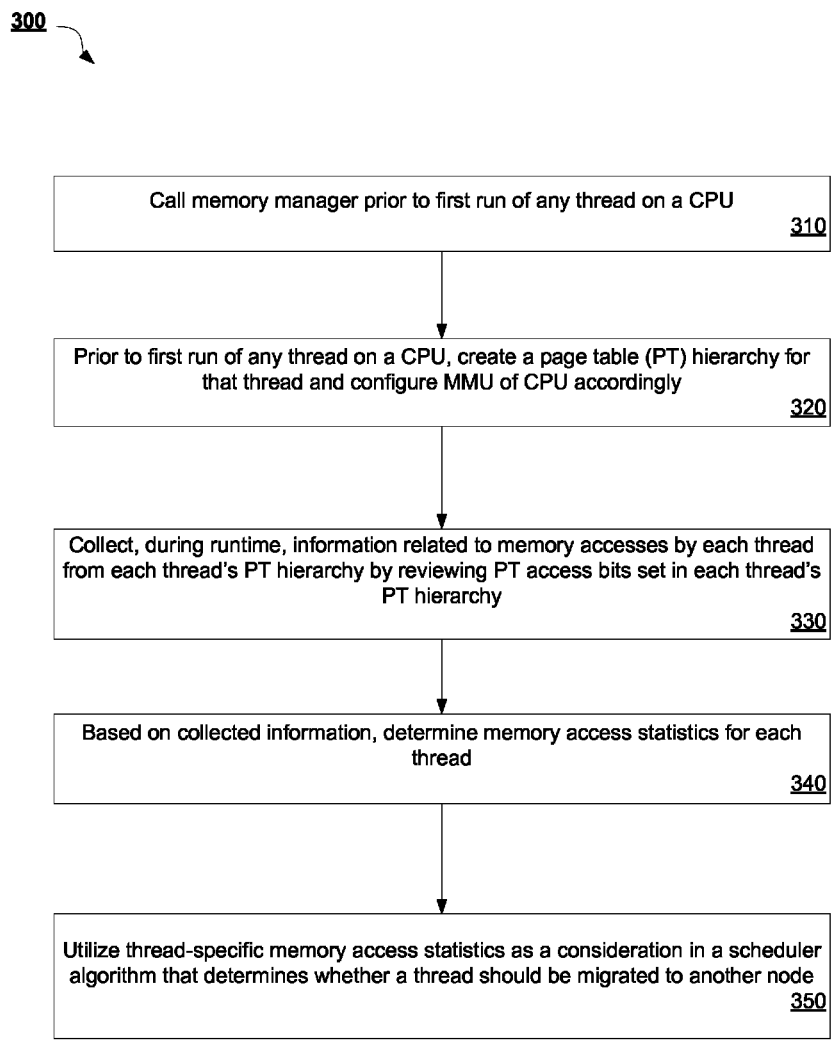
FIG. 3 is a flow diagram illustrating a method for tracking memory accesses in a NUMA system to optimize processor task placement according to an embodiment of the invention.

FIG. 3 is a flow diagram illustrating a method 300 performed by a memory manager and a scheduler of an OS for tracking memory accesses in a NUMA system to optimize processor task placement according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by computing device 100 of FIG. 1.

Method 300 begins at block 310 where a scheduler calls a memory manager prior to a first run of a thread on a CPU. Then, at block 320, the memory manager creates a PT hierarchy for the thread and configures the MMU of the CPU running that thread accordingly. The result of blocks 310 and 320 is the creation of multiple PT hierarchies each corresponding to a thread running on a CPU. For example, if there are twenty threads running on a CPU, then the memory manager creates twenty identical PTs that will translate the virtual memory addresses to physical memory addresses.

Subsequently, at block 330, the scheduler collects information associated with each thread's memory accesses from the thread's associated PT hierarchy during runtime. This information is collected by reviewing PT access bits set in each thread's PT hierarchy. Based on this collected information, the scheduler determines memory access statistics for each thread at block 340. For instance, the memory access statistics may indicate the frequency of remote memory access of each thread. Subsequently, at block 350, the thread-specific memory access statistics are submitted to a scheduler for use in determining whether a thread should be dynamically migrated during runtime to another node in the system.

Figure 4:
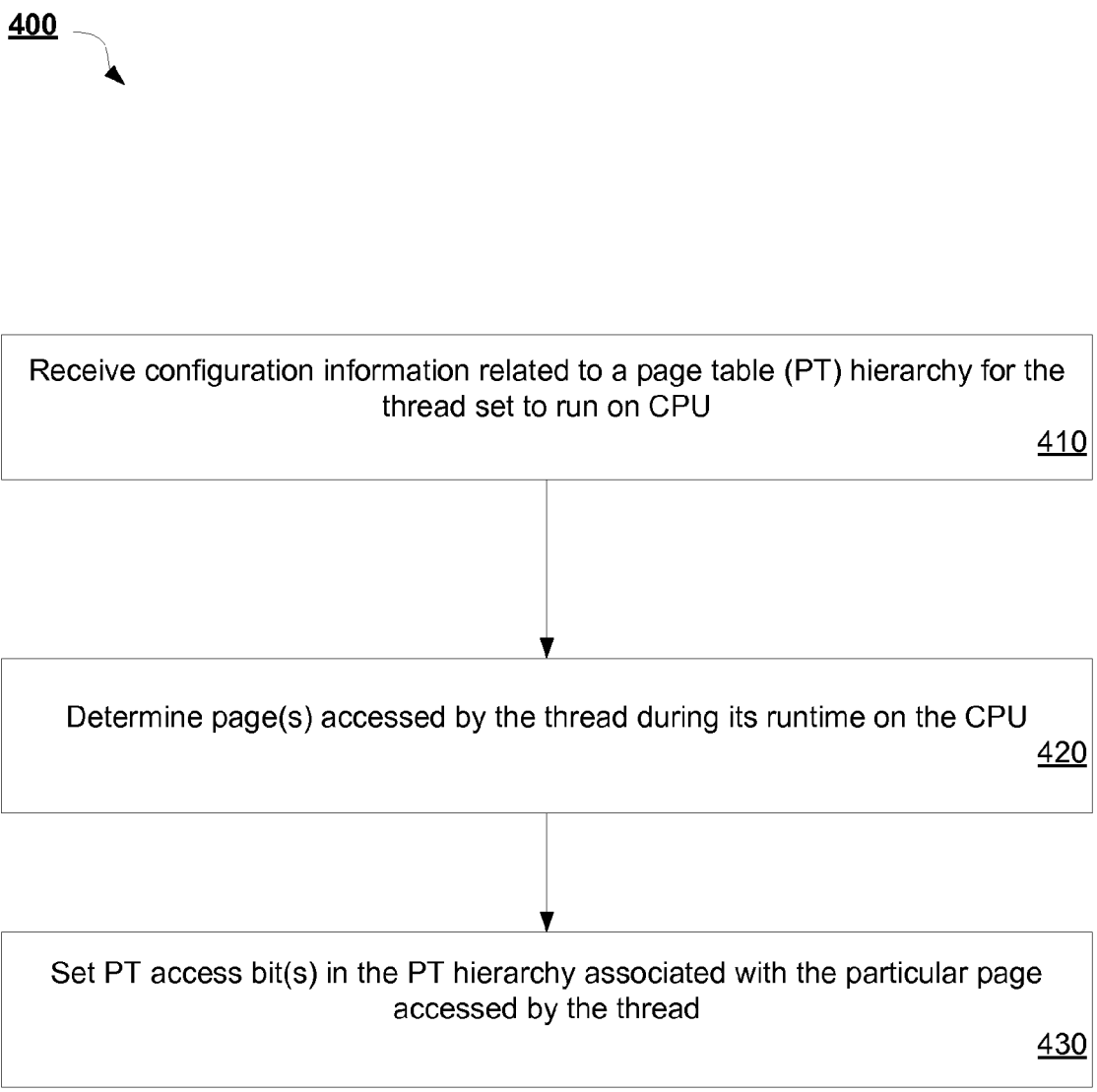
FIG. 4 is a flow diagram illustrating a method for tracking memory accesses in a NUMA system to optimize processor task placement according to an embodiment of the invention.

FIG. 4 is a flow diagram illustrating a method 400 performed by a MMU for tracking memory accesses in a NUMA system to optimize processor task placement according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by computing device 100 of FIG. 1.

Method 400 begins at block 410 where the MMU receives configuration information related to a PT hierarchy for a thread set to run on the CPU of the MMU. Then, at block 420, the page accesses are determined while the thread is run on the CPU. At block 430, PT access bits are set in the thread's corresponding PT hierarchy, where the access bits are associated with any determined accessed pages of the thread.

Figure 5:
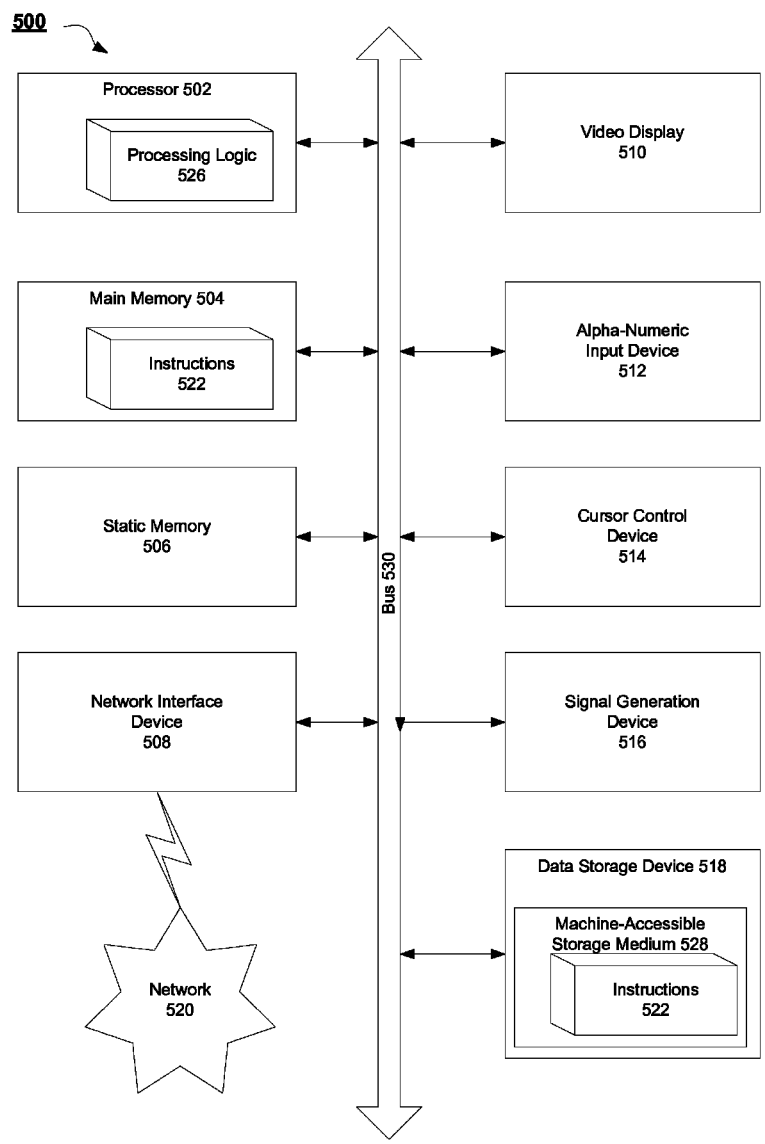
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to implement a method of tracking memory accesses in a NUMA system to optimize processor task placement performed by computing device 100 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to store instructions to perform methods 300 and 400 of tracking memory accesses in a NUMA system to optimize processor task placement described with respect to FIGS. 3 and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   creating, by a processing device, a page table (PT) hierarchy associated with a thread to be run on the processing device, wherein the PT hierarchy comprises:
   information identifying each memory page maintained in addressable memory space accessible by the thread; and
   access bits corresponding to each of the memory pages;
   utilizing, by the processing device, the PT hierarchy associated with the thread to identify locations of memory pages to access during execution of the thread by the processing device;
   setting the respective access bits of the memory pages accessed by the thread while the thread is executing on the processing device;
   collecting access bit information from the PT hierarchy associated with the thread, wherein the access bit information comprises the set access bits in the PT hierarchy;
   determining, in view of the collected access bit information, memory access statistics for the thread; and
   utilizing, by the processing device during runtime of the thread, the memory access statistics for the thread in a determination of whether to migrate the thread to another processing device during the runtime of the thread.

2. The method of claim 1, wherein the another processing device is located on a different node than a node hosting the processing device, and wherein the node and the different node are implemented as part of a non-uniform memory access (NUMA) architecture.

3. The method of claim 2, wherein each of the node and the different node host a distinct memory structure accessible by the processing device and the another processing device, and wherein the distinct memory structure is a remote memory structure to any thread that is not running on the node hosting the distinct memory structure.

4. The method of claim 3, wherein the memory access statistics indicate a frequency that the thread accesses a remote memory structure.

5. The method of claim 4, wherein if the frequency that the thread accesses the remote memory structure is high, then it is determined to migrate the thread to the node hosting the remote memory structure.

6. The method of claim 1, wherein a memory manager communicably coupled to the processing device creates identical PT hierarchies for each of one or more other threads running on the processing device.

7. The method of claim 6, wherein each of the one or more other threads causes a memory management unit (MMU) to set access bits in each thread's corresponding PT hierarchy to identify one or more memory pages accessed by the one or more other threads.

8. The method of claim 6, wherein the memory manager configures the MMU to utilize the PT hierarchy for the thread.

9. A system, comprising:
   a memory;
   a processing device communicably coupled to the memory; and
   a memory management unit (MMU) executable from the memory by the processing device, the MMU to:
   create a page table (PT) hierarchy associated with a thread to be run on the processing device, wherein the PT hierarchy comprises:
   information identifying each memory page maintained in addressable memory space accessible by the thread; and
   access bits corresponding to each of the memory pages;
   utilize the PT hierarchy associated with the thread to identify locations of memory pages to access during execution of the thread by the processing device;

set the respective access bit of one or more of the memory pages accessed by the thread while the thread is executing on the processing device;

collect access bit information from the PT hierarchy associated with the thread, wherein the access bit information comprises the set access bits in the PT hierarchy;

determine, in view of the collected access bit information, memory access statistics for the thread; and utilize, during runtime of the thread, the memory access statistics for the thread in a determination of whether to migrate the thread to another processing device during the runtime of the thread.

10. The system of claim 9, wherein the another processing device is located on a different node than a node hosting the processing device, and wherein the node and the different node are implemented as part of a non-uniform memory access (NUMA) architecture.

11. The system of claim 10, wherein each of the node and the different node host a distinct memory structure accessible by the processing device and the another processing device, and wherein the distinct memory structure is a remote memory structure to any thread that is not running on the node hosting the distinct memory structure, wherein the memory access statistics indicate a frequency that the thread accesses a remote memory structure.

12. The system of claim 11, wherein if the frequency that the thread accesses the remote memory structure is high, then it is determined to migrate the thread to the node hosting the remote memory structure.

13. The system of claim 9, wherein a memory manager communicably coupled to the processing device creates identical PT hierarchies for each of one or more other threads running on the processing device.

14. The system of claim 13, wherein each of the one or more other threads causes the MMU to set access bits in each thread's corresponding PT hierarchy to identify one or more memory pages accessed by the one or more other threads.

15. The system of claim 13, wherein the memory manager configures the MMU to utilize the PT hierarchy for the thread.

16. A non-transitory machine-readable storage medium including instructions that, when accessed by a processing device, cause the processing device to:

create, by the processing device, a page table (PT) hierarchy associated with a thread to be run on the processing device, wherein the PT hierarchy comprises:

information identifying each memory page maintained in addressable memory space accessible by the thread; and access bits corresponding to each of the memory pages;

utilize, by the processing device, the PT hierarchy associated with the thread to identify locations of memory pages to access during execution of the thread by the processing device;

set the respective access bit of one or more of the memory pages accessed by the thread while the thread is executing on the processing device;

collect access bit information from the PT hierarchy associated with the thread, wherein the access bit information comprises the set access bits in the PT hierarchy;

determine, in view of the collected access bit information, memory access statistics for the thread; and utilize, by the processing device during runtime of the thread, the memory access statistics for the thread in a determination of whether to migrate the thread to another processing device during the runtime of the thread.

17. The non-transitory machine-readable storage medium of claim 16, wherein the another processing device is located on a different node than a node hosting the processing device, and wherein the node and the different node are implemented as part of a non-uniform memory access (NUMA) architecture.

18. The non-transitory machine-readable storage medium of claim 17, wherein each of the node and the different node host a distinct memory structure accessible by the processing device and the another processing device, and wherein the distinct memory structure is a remote memory structure to any thread that is not running on the node hosting the distinct memory structure.

19. The non-transitory machine-readable storage medium of claim 16, wherein a memory manager communicably coupled to the processing device creates identical PT hierarchies for each of one or more other threads running on the processing device.

20. The non-transitory machine-readable storage medium of claim 19, wherein each of the one or more other threads causes a memory management unit (MMU) to set access bits in each thread's corresponding PT hierarchy to identify one or more memory pages accessed by the one or more other threads.

* * * * *